United States Patent [19]

Peters et al.

[11] Patent Number: 5,039,449

[45] Date of Patent: Aug. 13, 1991

[54] METHOD FOR IMPROVING A MANGANESE ACTIVATED ZINC SILICATE PHOSPHOR

[75] Inventors: Thomas E. Peters, Chelmsford; Roger B. Hunt, Medfield; A. Gary Sigai, Lexington, all of Mass.

[73] Assignee: GTE Laboratories Incorporated, Waltham, Mass.

[21] Appl. No.: 267,880

[22] Filed: Nov. 7, 1988

[51] Int. Cl.$^5$ ..................... C09K 11/59; C09K 11/68
[52] U.S. Cl. ........................... 252/301.5; 252/301.6 F
[58] Field of Search ...................... 252/301.5, 301.6 F

[56] References Cited

U.S. PATENT DOCUMENTS

| | | | |
|---|---|---|---|
| 3,416,019 | 12/1968 | Kaduk | 252/301.6 F |
| 4,315,190 | 2/1982 | Peters et al. | 252/301.6 F |
| 4,390,449 | 6/1983 | Peters et al. | 252/301.6 F |
| 4,728,459 | 3/1988 | Fan et al. | 252/301.6 F |

*Primary Examiner*—Jack Cooper
*Attorney, Agent, or Firm*—Carl F. Ruoff; Ivan L. Ericson

[57] ABSTRACT

A new and improved method of treating a manganese activated zinc silicate phosphor is described. The method comprises heating a manganese activated zinc silicate phosphor powder having cations consisting essentially of zinc, silicon, manganese, and tungsten and having a 350 nm reflectance less than 80% and a 275 nm reflectance greater than 13.5% to a temperature of about 1225° C. in air. The phosphor powder is then cooled to room temperature and wet milled in an acid solution. The phosphor powder is then separated from the acid solution washed in water and dried to form a dry phosphor powder having a 350 nm reflectance equal to or greater than 80% and a 275 nm reflectance equal to or less than 13.5%.

14 Claims, 2 Drawing Sheets

METHOD FOR IMPROVING A MANGANESE ACTIVATED ZINC SILICATE PHOSPHOR

FIELD OF THE INVENTION

This invention relates to a method of improving a manganese activated zinc silicate phosphor. More particularly, this invention relates to a heat treating method for improving the reflectivity of a manganese activated zinc silicate phosphor.

BACKGROUND OF THE INVENTION

This invention is concerned with a manganese-activated zinc orthosilicate phosphor, $Zn_2SiO_4$:Mn. The phosphor emits in the green region of the visible spectrum and is used, for example, in fluorescent lamps and cathode ray tubes.

Some of the problems associated with $Zn_2SiO_4$:Mn phosphors are their relatively poor fluorescent lamp performance and maintenance. Poor maintenance means that the light output, or lumens per watt, of the phosphor decreases to a greater extent during lamp life than is desirable. This invention is concerned with a manganese-activated zinc silicate phosphor having an improved reflectivity resulting in an improved fluorescence efficiency.

The importance of high-performance, green-emitting phosphors with low depreciation characteristics in fluorescent lamps, has increased in recent years with the growing demand for high CRI performance lamps. For that reason, in particular, an improved method for preparing manganese-activated zinc orthosilicate phosphors would represent a significant advancement in the art.

SUMMARY OF THE INVENTION

In accordance with one aspect of the present invention, a new and improved method of improving the reflectivity of a manganese activated zinc silicate phosphor powder having cations consisting essentially of zinc, silicon, manganese, and tungsten and having a 350 nm reflectance less than 80% and a 275 nm reflectance greater than 13.5% comprises the following steps:

Step 1—Heat the phosphor powder to a temperature of about 1225° C. in air.

Step 2—Cool the phosphor powder from step 1 to room temperature.

Step 3—Wet-mill the phosphor powder from Step 2 in an acid solution.

Step 4—Separate the phosphor powder in Step 3 from the acid solution.

Step 5—Wash the phosphor powder from Step 4 with water.

Step 6—Dry the phosphor powder from Step 5 to form a dry phosphor powder having a 350 nm reflectance equal to or greater than 80%, and a 275 nm reflectance equal to or less than 13.5%.

Figure 1:
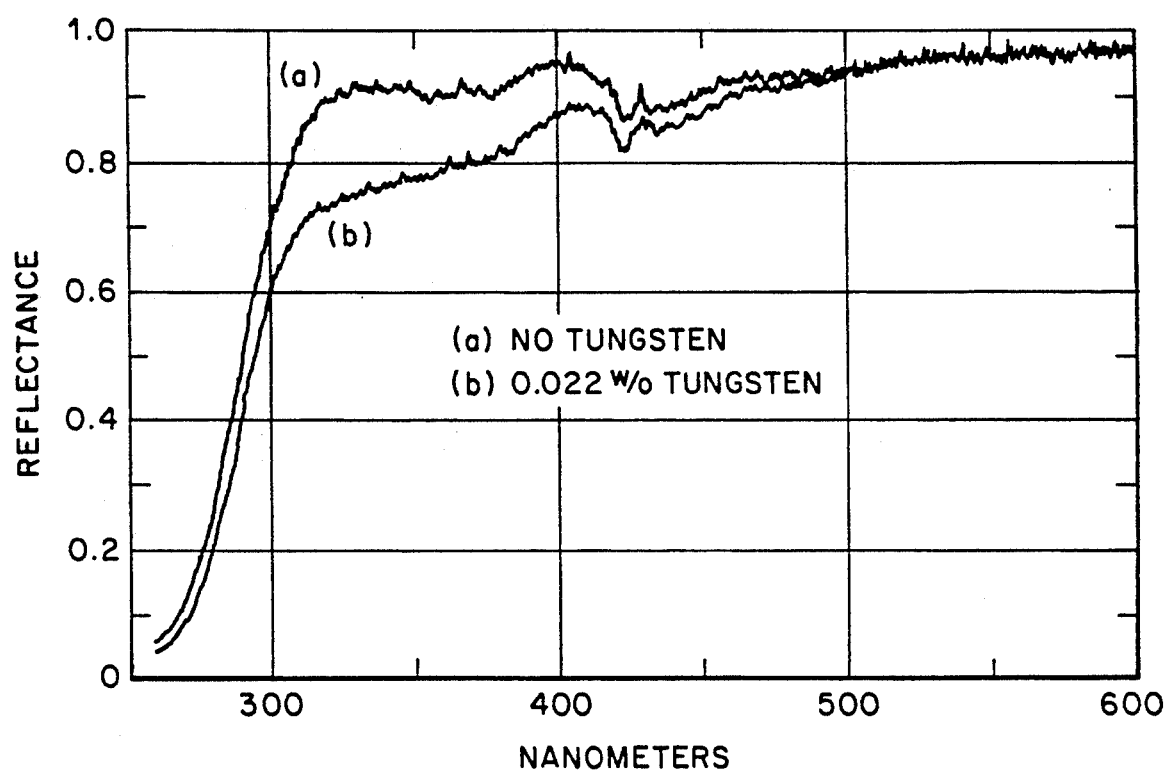
FIG. 1 are curves of the optical reflectance of a virgin manganese activated zinc silicate phosphor in the 250–600 nm region of the spectrum in accordance with the present invention. Curve (a) is the optical reflectance of a virgin manganese activated zinc silicate phosphor which contains no tungsten and curve (b) is the optical reflectance of a virgin manganese activated zinc silicate phosphor containing 0.022 wt % tungsten.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

A new and improved method of treating a virgin manganese activated zinc silicate phosphor is described. The method improves the reflectance characteristics of the phosphor before it is alumina coated, annealed, and incorporated into a fluorescent lamp.

The virgin manganese activated zinc silicate phosphor can be defined and identified by its cation composition. The cation composition consisting essentially of: zinc, silicon, manganese, and tungsten. The term "cation" as used to describe elements present in the phosphor composition means the elements present in the phosphor composition other than oxygen.

The new and improved method of treating the virgin phosphor also improves the lumen output performance of the phosphor after it has been alumina coated, annealed and incorporated into a fluorescent lamp.

The desired reflectance characteristics are: (1) a reflectance at 275 nm equal to or less than 13.5% and (2) a reflectance at 350 nm equal to or greater than 80%.

The following are Examples of the new and improved method.

EXAMPLE #1

Approximately 0.5 Kg. of a virgin manganese activated zinc silicate phosphor powder having a 275 nm reflectance of 16.0%, a 350 nm reflectance of 73.%, a BET surface area of 0.54 $m^2$/gm, a zinc cation concentration of 57% by weight, a silicon cation concentration of 13.0% by weight, a tungsten cation concentration of 0.057% by weight, and a manganese cation concentration of 3.3% by weight was placed in a quartz boat and heated at 20° C./min to a temperature of 1225° C., in an ambient of static air. The phosphor was held at that temperature for a predetermined period, ranging from 4 to 16 Hrs., as indicated by samples 2–6 in Table I, and was then cooled at 20° C./min to 900° C. and removed from the furnace. After cooling to room temperature, the partially sintered phosphor cake was roll crushed to a powder and sieved through a 60 mesh screen. The phosphor was subsequently loaded into a 2 liter (4.5"dia.×9"ht.) polyethylene mill jar containing 600 ml of citric acid solution (0.48 w/o citric acid/gm phosphor) and 0.5 Kg. of burundum grinding cylinders ($\frac{1}{2}"\times\frac{1}{2}"$) and rolled at 91 rpm for 30 min. Upon completion of this wet milling process, the phosphor was separated from the citric acid solution by filtering and the phosphor was dispersed in 1.0 liter of distilled water. The phosphor was allowed to settle for 15 minutes and most of the water was decanted off, together with some of the fine phosphor particles that remained in suspension. The water dispersion and decanting process was then repeated a second time and was followed by a final dispersion in water and subsequent washing and suction drying on a buchner funnel. The phosphor received a final drying process in a 100° C. oven for at least 3 hours, and was ready for use after sieving through a 400 mesh screen. The phosphor was then coated with alumina, annealed and incorporated into 40W-T12 fluorescent lamps.

EXAMPLE #2

Approximately 0.5 Kg. of the same lot of the virgin manganese activated zinc silicate phosphor powder used in Example #1 was placed in a quartz boat and heated at 20° C./min to a temperature of 1225° C., in an ambient of static air. The phosphor was held at that temperature for approximately 16 Hrs., and was then cooled at 20° C./min to 900° C. and removed from the furnace. After cooling to room temperature, the partially sintered phosphor cake was roll crushed to a powder and sieved through a 60 mesh screen. The phosphor was subsequently loaded into a 2 liter (4.5"dia.×9"ht.) polyethylene mill jar containing 600 ml of citric acid solution (0.48 w/o citric acid/gm phosphor) and 0.5 Kg. of burundum grinding cylinders ($\frac{1}{2}"\times\frac{1}{2}"$) and rolled at 91 rpm for 30 min. Upon completion of this wet milling process, the phosphor was separated from the citric acid solution by filtering and the phosphor was dispersed in 1.0 liter of distilled water. The phosphor was allowed to settle for 15 minutes and most of the water was decanted off, together with some of the fine phosphor particles that remained in suspension. The water dispersion and decanting process was then repeated a second time and was followed by a final dispersion in water and subsequent washing and suction drying on a buchner funnel. The phosphor received a final drying process in a 100° C. oven for at least 3 hours. Two weight percent of ammonium chloride was added to approximately 350 gm of the dried phosphor and blended. The blended mixture was then fired at a temperature of 1000° C. for 2 hours in air and cooled to room temperature. The partially sintered phosphor cake was roll crushed to a powder and sieved through a 60 mesh screen. The phosphor was subsequently loaded into a 2 liter (4.5"dia.×9"ht.) polyethylene mill jar containing 600 ml of citric acid solution (0.48 w/o citric acid/gm phosphor) and 0.5 Kg. of burundum grinding cylinders ($\frac{1}{2}"\times\frac{1}{2}"$) and rolled at 91 rpm for 30 min. Upon completion of this wet milling process, the phosphor was separated from the citric acid solution by filtering and the phosphor was dispersed in 1.0 liter of distilled water. The phosphor was allowed to settle for 15 minutes and most of the water was decanted off, together with some of the fine phosphor particles that remained in suspension. The water dispersion and decanting process was then repeated a second time and was followed by a final dispersion in water and subsequent washing and suction drying on a buchner funnel. The phosphor received a final drying process in a 100° C. oven for at least 3 hours, and was ready for use after sieving through a 400 mesh screen. The phosphor was then coated with alumina, annealed and incorporated into 40W-T12 fluorescent lamps.

Curve (a) in FIG. 1, shows the optical reflectance of a virgin manganese activated zinc silicate phosphor in the 250-600 nm region of the spectrum. The small dips in reflectance in the 330-420 nm range are due to $Mn^{2+}$ absorptions, while the stronger drop below 330 nm can be attributed to host lattice absorption, modified by the presence of the Mn activator. Once the 275 nm reflectance of a virgin manganese activated zinc silicate phosphor having about 3.3 w/o Mn has been determined, the relationship depicted in FIG. 2 can be used to estimate the zero hour lumen output (brightness) of the phosphor after it has been alumina coated, annealed and incorporated into a lamp. In FIG. 1 curve (b), represents the reflectance of a virgin manganese activated zinc silicate phosphor containing 0.022 w/o tungsten before it was heat treated by the new and improved method of invention as described above. As observed in curve (b) of FIG. 1, an absorption in the 300-400 nm range is associated with the presence of tungsten. This absorption has been found to reduce the actual zero hour lumen output of the alumina coated and annealed manganese activated zinc silicate phosphors by as much as 300 lumens below that predicted by the 275 nm reflectance measurement because of induced body color.

The reflectance measurements were obtained with a Spex Industries Model 1902 spectrofluorometer. The emission and excitation monochromators were scanned in tandem through the spectral range of interest. The excitation source was a 450 Watt Xenon arc lamp.

The powder samples were pressed into anodized aluminum plugs and mounted in the sample compartment of the spectrofluorometer. The incident beam of the spectrofluorometer impinged the sample at −22.5° from normal and the scattered light was collected at 22.5° such that the incident and reflected rays subtend a 45° angle bisected by the sample face normal.

A Kodak reflectance standard powder (#6091) was prepared as described above for the powder sample. A "standard" raw reflectance spectrum was acquired and stored under computer control. Then the sample was measured in an identical fashion. The spectrum of the sample is divided by the spectrum of the Kodak standard (taken to be unity) to derive the corrected reflectance values shown in FIG. 1 and FIG. 2.

Figure 2:
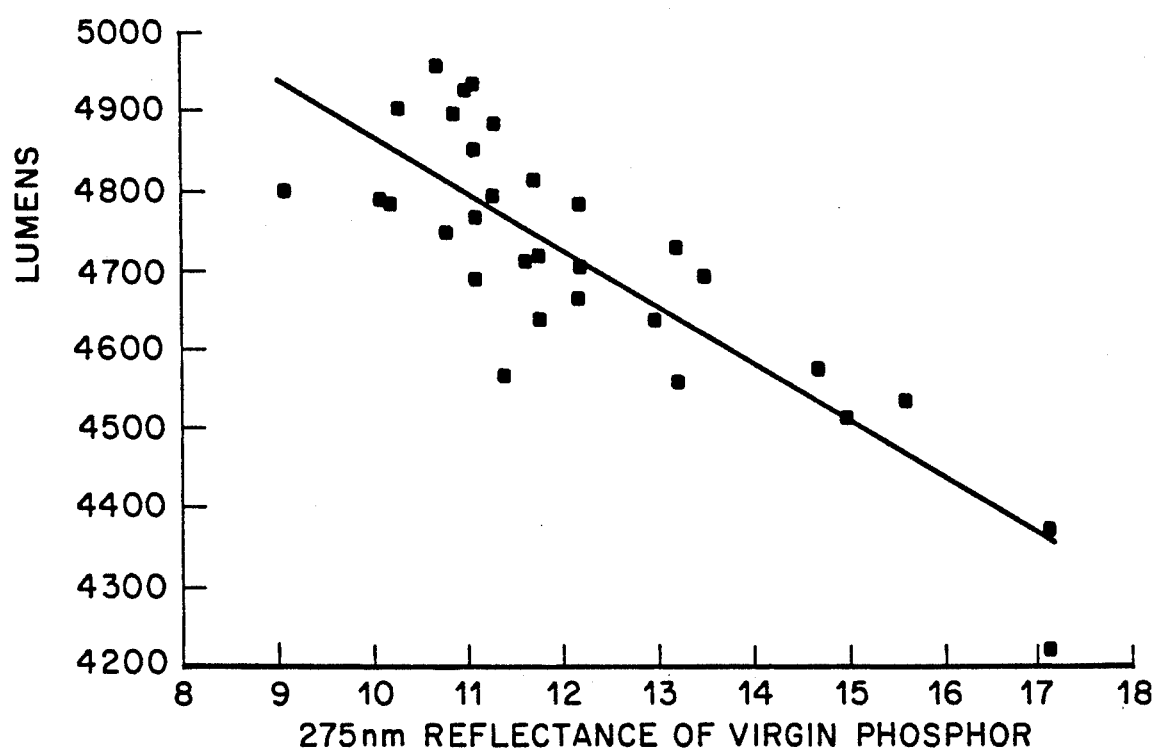
FIG. 2 is a curve of 40W-T12 lamp zero hour lumen output (brightness) of alumina coated and annealed manganese activated zinc silicate phosphors as a function of the 275 nm reflectance of the virgin manganese activated zinc silicate phosphor from which they were derived in accordance with the present invention.

Generally speaking, maximum lumen output (brightness) can be obtained from an alumina coated and annealed manganese activated zinc silicate phosphor when the 275 nm reflectance of the virgin manganese activated zinc silicate phosphor is as low as possible, preferably equal to or less than 13.5% and when the 350 nm reflectance is as high as possible, preferably equal to or greater than 80%. However, some virgin manganese activated zinc silicate phosphors have exhibited 275 nm reflectances as high as 17%, as shown in FIG. 2., and when significant amounts of tungsten were present, 350 nm reflectances were as low as 67%. The new and improved method of this invention provides a method of improving the reflectances of virgin manganese activated zinc silicate phosphors that do not meet the desired values so that when the phosphors are alumina coated, annealed, and incorporated into a lamp the lumen output is also improved.

Shown in Table I are the resulting zero hour lumen data of lamps made from virgin manganese activated zinc silicate phosphors processed as indicated in accordance with the new and improved methods, examples of which are depicted by Example #1 and Example #2. As indicated, the resulting reflectance and surface area data can be used as an indicator of what one can expect from the phosphor when processed into a lamp. The surface area was determined by a single point BET measurement on a Quantachrome Monosorb surface area instrument. Prior to measurement the sample was outgassed at 300° C. for 1 hour. Sample #1 is the virgin manganese activated zinc silicate phosphor not treated by the method of this invention but was alumina coated, annealed, and processed into a lamp. Samples #2 through #6 started with the same virgin manganese activated zinc silicate phosphor but were processed by the new and improved method as described in Example #1 at the specific heating times indicated.

Sample #7 started with the same virgin manganese activated zinc silicate phosphor as Samples 1-6, but was processed by the new and improved method in accordance with Example #2.

TABLE I

Reflectance, Surface Area, and Lumens As a Function of Heating Time

| Sample No. | Process Heating Time [T = 1225° C.] | 275 nm Refl. % | 350 nm Refl. % | BET Surface Area m²/gm | 40 W T12 Lamp 0 Hr. Lumens |
|---|---|---|---|---|---|
| #1 | 0 hrs | 16.0 | 73.0 | 0.54 | 4362 |
| #2 | 4 hrs | 13.5 | 89.4 | 0.44 | 4687 |
| #3 | 6 hrs | 13.2 | 83.8 | 0.42 | 4722 |
| #4 | 7 hrs | 11.7 | 84.1 | 0.34 | 4810 |
| #5 | 8 hrs | 11.1 | 80.9 | 0.35 | 4849 |
| #6 | 16 hrs | 10.0 | 75.0 | 0.28 | 4782 |
| #7 (a) | 16 hrs 2 hrs | 10.7 | 82.9 | 0.28 | 4949 |

(a) double firing:
1225° C. - 16 hrs. air
1000° C. - 2 hrs with 2% NH₄Cl.

In addition to the improved reflectance and lumen output performance of the phosphor treated by this new and improved method, this method provides a phosphor which can be easily measured to determine the optical reflection of the treated virgin manganese activated zinc silicate phosphor at 275 and 350 nm and to estimate the minimum performance level of the phosphor after it is alumina coated, annealed, and incorporated into 40W-T12 lamps. This permits the evaluation of the phosphor before it is made into a lamp and permits phosphors that will fall below the standards established to be identified before the added costs of alumina coating, annealing, and lamp making are incurred. The success of this technique is surprising because it is contrary to the commonly accepted view which holds that measurements performed on a phosphor outside the lamp envelop are of little value in predicting its lamp performance.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method of improving the reflectivity of a manganese activated zinc silicate phosphor powder having cations consisting essentially of zinc, silicon, manganese, and tungsten and having a 350 nm reflectance less than 80%, and a 275 nm reflectance greater than 13.5% comprising the following steps:
    Step 1—heating said phosphor powder in a furnace to a temperature of about 1225° C. in air;
    Step 2—cooling said phosphor powder from Step 1;
    Step 3—wet milling said phosphor powder from Step 2 in an acid solution;
    Step 4—separating said phosphor powder from Step 3 from said acid solution;
    Step 5—washing said phosphor powder from Step 4 with water; and
    Step 6—drying said phosphor powder from Step 5 to form a manganese activated zinc silicate phosphor powder having a 350 nm reflectance equal to or greater than 80%, and a 275 nm reflectance equal to or less than 13.5%.

2. A method in accordance with claim 1 wherein said acid solution comprises a citric acid solution.

3. A method in accordance with claim 1 wherein said heating in Step 1 is maintained for a period of about four to about 16 hours.

4. A method in accordance with claim 1 wherein said phosphor powder from Step 2 is roll crushed and sieved through a 60 mesh screen.

5. A method in accordance with claim 1 wherein said phosphor powder in Step 4 is dispersed in water, allowed to settle, and said water is decanted from the settled phosphor powder.

6. A method of improving the reflectivity of a manganese activated zinc silicate phosphor powder having cations consisting essentially of zinc, silicon, manganese, and tungsten and having a 350 nm reflectance less than 80%, and a 275 nm reflectance greater than 13.5% comprising the following steps:
    Step 1—heating said phosphor powder in a furnace to a temperature of about 1225° C. in air;
    Step 2—maintaining said temperature of Step 1 for a period of about four to about 16 hours;
    Step 3—cooling said phosphor powder from Step 2 to a temperature of about 900° C.;
    Step 4—removing said phosphor powder from Step 3 from said furnace and cooling said phosphor powder to room temperature;
    Step 5—roll crushing said phosphor powder from Step 4;
    Step 6—sieving said phosphor powder from Step 5 through a 60 mesh screen;
    Step 7—wet milling said phosphor powder from Step 6 in a citric acid solution;
    Step 8—separating said phosphor powder from Step 7 from said citric acid solution;
    Step 9—dispersing said phosphor powder from Step 8 in distilled water;
    Step 10—settling said phosphor powder from Step 9 for about 15 minutes;
    Step 11—separating said phosphor powder from Step 10 from the distilled water by decantation;
    Step 12—repeating Steps 9 through 11;
    Step 13—drying said phosphor powder from Step 12; and
    Step 14—sieving said phosphor powder from Step 13 through a 400 mesh screen to form a sieved phosphor powder having a 350 nm reflectance equal to or greater than 80% and a 275 nm reflectance equal to or less than 13.5%.

7. A Method of improving the reflectivity of a manganese activated zinc silicate phosphor powder having cations consisting essentially of zinc, silicon, manganese, and tungsten and having a 350 nm reflectance less than 80%, and a 275 nm reflectance greater than 13.5% comprising the following steps:
    Step 1—heating said phosphor powder in a furnace to a temperature of about 1225° C. in air;
    Step 2—cooling said phosphor powder from Step 1;
    Step 3—wet milling said phosphor powder from Step 2 in an acid solution;
    Step 4—separating said phosphor powder from Step 3 from said acid solution;
    Step 5—washing said phosphor powder from Step 4 with water;

Step 6—drying said phosphor powder from Step 5;
Step 7—adding NH$_4$Cl to said phosphor powder from Step 6 to form a mixture of said NH$_4$Cl and said phosphor powder;
Step 8—heating said mixture of said NH$_4$Cl and said phosphor powder from Step 7 in a furnace to a temperature of about 1000° C. in air;
Step 9—cooling said phosphor powder from Step 8;
Step 10—wet milling said phosphor powder from Step 9 in an acid solution;
Step 11—separating said phosphor powder from Step 10 from said acid solution;
Step 12—washing said phosphor powder from Step 11 with water; and
Step 13—drying said phosphor powder from Step 12 to form a manganese activated zinc silicate phosphor powder having a 350 nm reflectance equal to or greater than 80%, and a 275 nm reflectance equal to or less than 13.5%.

8. A method in accordance with claim 7 wherein said acid solution comprises a citric acid solution.

9. A method in accordance with claim 7 wherein said heating in Step 1 is maintained for a period of about four to about 16 hours.

10. A method in accordance with claim 7 wherein said phosphor powder from Step 2 is roll crushed and sieved through a 60 mesh screen.

11. A method in accordance with claim 7 wherein said phosphor powder in Step 4 is dispersed in water, allowed to settle, and said water is decanted from said settled phosphor powder.

12. A method in accordance with claim 7 wherein said heating in Step 8 is maintained for a period of about two hours.

13. A method in accordance with claim 7 wherein said phosphor powder from Step 9 is roll crushed and sieved through a 60 mesh screen.

14. A method in accordance with claim 7 wherein said phosphor powder from Step 11 is dispersed in water, allowed to settle, and said water is decanted from the settled phosphor powder.

* * * * *